United States Patent [19]  
Speakman

[11] 4,048,434  
[45] Sept. 13, 1977

[54] METHOD FOR PREPARING AN ACID MODIFIED OXIDIZED HYDROXYALKYL STARCH

[75] Inventor: Edwin L. Speakman, Clinton, Iowa

[73] Assignee: Standard Brands Incorporated, New York, N.Y.

[21] Appl. No.: 582,022

[22] Filed: May 29, 1975

Related U.S. Application Data

[63] Continuation-in-part of Ser. No. 438,820, Feb. 1, 1974, abandoned.

[51] Int. Cl.² .................... C08B 31/18; C08B 33/08
[52] U.S. Cl. .................................. 536/105; 536/111
[58] Field of Search ............... 260/233.3 A, 233.3 R; 536/105, 111

[56] References Cited

U.S. PATENT DOCUMENTS

| | | | |
|---|---|---|---|
| 2,516,633 | 7/1950 | Kesler et al. | 260/233.3 R |
| 2,999,090 | 9/1961 | Hobbs | 260/233.3 R |
| 3,655,644 | 4/1972 | Durand | 260/233.3 R |

Primary Examiner—Melvyn I. Marquis

[57] ABSTRACT

Acid modified oxidized hydroxyalkyl starch is prepared by the sequential steps of:
  (a) reacting granular starch with a 1,2-alkylene epoxide under conditions whereby starch having a hydroxyalkyl D of S of from about 0.02 to less than about 0.18 is obtained and the granular nature of the starch is maintained,
  (b) oxidizing the hydroxyalkyl starch with an alkaline hypochlorite under suitable conditions to introduce an amount of carboxylic groups onto said starch, the amount being no greater than about 1.2 minus the product of 7 times the hydroxyalkyl D of S,
  (c) treating the oxidized hydroxyalkyl starch with an acid to increase the alkaline paste fluidity thereof, and
  (d) recovering the resulting product.

5 Claims, No Drawings

METHOD FOR PREPARING AN ACID MODIFIED OXIDIZED HYDROXYALKYL STARCH

BACKGROUND OF THE INVENTION

This application is a continuation-in-part of patent application Ser. No. 438,820, filed Feb. 1, 1974 and now abandoned.

This invention relates to a method for preparing acid modified oxidized hydroxyalkyl starch.

It is known in the starch industry to react starch with alkylene epoxides to form the corresponding hydroxyalkyl ethers of starch. Such hydroxyalkyl ethers of starch are produced by the alkali-catalyzed reaction of aqueous suspension of granular starch with the epoxides at temperatures below the gelatinization temperature of the starch granules. This reaction is disclosed in U.S. Pat. No. 2,516,633 to Kesler et al. U.S. Pat. No. 2,999,090 to Hobbs discloses a process for the preparation of an oxidized hydroxyalkyl starch wherein a starch slurry is first treated with lime and ethylene oxide. After a certain reaction period, the slurry is acidified to a relatively low pH, washed with acidified water and finally with water. The resulting starch is then slurried, the pH adjusted to at least 8 and then an oxidant is incorporated therein to oxidize the hydroxyalkyl starch. While hydroxyalkyl starches have better viscosity stability, lower tendency to retrograde and high adhesiveness, the use of dried films prepared from such starches has been limited in paper coatings due to their poor clarity and water solubility. Thus, their use in paper coatings has been limited.

Oxidized starches are commonly made by reaction of an aqueous suspension of granular starch with a sodium or calcium hypochlorite solution. The oxidized starches have higher fluidity, increased adhesiveness, lower retrogradation rate and somewhat better film clarity than untreated or common starch.

Another method of preparing oxidized starches is to react starch with a peroxidic compound, e.g., an alkaline peroxide.

While oxidized starches are suitable for surface sizing of paper, they tend to retrograde excessively and their films lack sufficient clarity for use in coating colors.

BRIEF DESCRIPTION OF THE INVENTION

In view of the shortcomings of the starches produced by either oxidation or hydroxyalkylation alone, it has surprisingly been discovered that a combination of both processes yields a starch product having certain improved properties or characteristics. Accordingly, the present invention is directed to a method for preparing a gelatinizable acid modified oxidized hydroxyalkyl starch by the sequential steps of: (a) reacting granular starch with a 1,2-alkylene epoxide containing 2 to 4 carbon atoms, inclusively, under nongelatinizing conditions to obtain a granular starch having a hydroxyalkyl D of S of from about 0.02 to less than about 0.18, and (b) oxidizing the hydroxyalkyl starch under conditions to introduce an amount of carboxylic groups onto said starch, the amount of carboxylic groups, percent by weight dry starch basis, being no greater than about 1.2 minus the product of 7 times the hydroxyalkyl D of S. The resulting starch product is then treated with an acid to increase the alkaline paste fluidity thereof. The treatment is carried out under conditions such that 1. the starch having a D of S of from about 0.02 to about 0.1 has an alkaline paste fluidity of less than about 293,
2. the starch having a D of S of from about 0.11 to about 0.13 has an alkaline paste fluidity of less than about 283, and
3. the starch having a D of S of from about 0.14 to less than about 0.18 has an alkaline paste fluidity of less than about 210.

DETAILED DESCRIPTION OF THE INVENTION

REACTANTS

A wide variety of starches may be utilized in the invention so long as they are granular in character. Thus, the term "starch" includes both root and cereal starches, e.g., corn, potato, tapioca, wheat, waxy sorghum, waxy maize, grain sorghum, and rice, whether unmodified or acid modified. However, it will normally be preferred to use unmodified granular corn starches because of economics.

Suitable hydroxyalkylating reagents include 1,2-alkylene epoxide containing 2 to 4 carbon atoms, inclusively, such as ethylene oxide, propylene oxide and butylene oxide. It is preferred to use ethylene oxide because of its higher reaction rate.

Materials suitable as oxidizing agents include alkaline hypochlorites such as alkali metal and alkaline earth metal hypochlorites. The preferred oxidizing agents are the monovalent alkali metal salts, e.g., sodium or potassium hypochlorite.

PROCESS VARIABLES

The hydroxyalkylation reaction must be carried out in highly alkaline slurry, i.e., at a pH of above about 10, for reasonable reaction efficiencies. However, the pH must not be high enough to substantially damage the starch granules. To facilitate the use of higher pH's and temperatures, it is preferred to include in the reaction mixture a gelatinization inhibitor in order to maintain the starch reaction product in granular form. Saturated solutions of neutral alkali metal and alkali earth metal salts such as NaCl $Na_2SO_4$ and $NgSO_4$ are useful for this purpose in which case alkali concentrations as high as 0.2 mole per anhydroglucose unit may be used without causing substantial damage to the starch granule.

It is necessary that the starch be hydroxyalkylated to a D of S of at least about 0.02 and preferably at least about 0.03. At exceedingly higher D of S, for example above about 0.18, the starch loses its native granule form. At a D of S less than 0.02 there is no apparent improvement in the properties of such starches.

The oxidation reaction may be carried out at the same pH as the hydroxyalkylation step. However, it is preferred that the pH of the hydroxyalkylated starch be lowered to the range of from about 6 to about 8 by addition of acid prior to the oxidation reaction being carried out. Preforming the oxidation reaction in the lower pH range reduces the loss of soluble starch during subsequent handling.

Starch concentration is not a critical variable during either the hydroxyalkylation or oxidation step. Practical starch concentrations range from about 25 to about 45 percent by weight.

Reaction temperature in either step of the process of the invention is not critical, although the temperature must be below that which causes substantial damage to the starch granule. In this regard, it is preferred to perform both reactions below about 38° C and most preferably below about 29° C.

The sequence of hydroxyalkylation followed by oxidation results in less starch solubles being lost during subsequent handling and the efficiency of utilization of the alkylene oxide is increased as compared to the reactions being performed in the reverse manner.

High concentrations of carboxyl groups are detrimental when the product is to be used in coating applications since they will tend to cause pigments to redisperse resulting in high pigment losses when repulped broke is recycled to the furnish section of a conventional paper making machine.

The oxidized hydroxyalkyl starch is lastly treated with an acid to increase its alkaline paste fluidity. Any mineral acid may be used for this purpose such as HCl, $H_2SO_4$ and the like. It is critical that the acid treatment be carried out under conditions such that the starch granules are not damaged to any substantial degree. The degree to which the acid treatment is carried out is dependent upon the D of S and the carboxyl content of the starch. When the D of S of the oxidized starch is from about 0.02 to about 0.1, the acid treatment is carried out to obtain a product having an alkaline paste fluidity of less than about 293. Oxidized hydroxyalkyl starch having a D of S of from about 0.11 to about 0.13 is treated to obtain an alkaline paste fluidity of less than about 283. When the oxidized hydroxyalkyl starch has a D of S of from about 0.14 to less than about 0.18, the treatment is carried out to obtain a product having an alkaline paste fluidity of less than about 210.

The degree of acid treatment and hydroxyalkylation and the extent of oxidation are interrelated. When the total carboxyl content of the starch (percent by weight) exceeds a value corresponding to about $1.2 - (7 \times D$ of S) where D of S is the degree of substitution of hydroxyalkyl groups on the starch product, the resulting product becomes highly cold water soluble and is extremely difficult to filter and is virtually incapable of recovery and purification by other than exceptional finishing techniques, such as centrifugation and alcohol precipitation. The acid treatment, on the other hand, does not significantly affect the cold water solubility of the starch but does significantly affect the granular nature of the starch. This too, however, deleteriously affects the filterability of the resulting product and thus, unless the acid treatment is performed to obtain a product having the alkaline paste fluidities enumerated above, the treated product cannot be recovered by procedures normal to the starch industry.

DEFINITIONS, ANALYTICAL AND TEST METHODS

Alkaline Paste Fluidity: The alkaline paste fluidity was determined by the method described by Fetzer et al. in an article in *Cereal Chemistry*, Vol. 36, No. 2, (March 1959), entitled "The Estimation of Starch Paste Fluidities." The funnel used is described on page 114 of this article.

Brabender Cooks: Performed using a VISCO/Amylo/GRAPH instrument manufactured by C. W. Brabender Instruments Inc., South Hackensack, N.J. The instrument was standarized against a reference curve provided by C. W. Brabender Instruments Inc. from their standard instrument, and employed a sample of the starch used for making the reference curve. For this test, an appropriate amount of dry basis starch sample was weighed out and mixed thoroughly into about 450 ml of distilled water. The pH of the mixture was adjusted to 6.5 using dilute acid or base as required. The volume of the mixture was made up to 500 ml. The instrument was activated and run through the following time-temperature cycles: 30 minutes from 50° to 95° C; 30 minutes held at 95° C; 30 minutes from 95° to 50° C; and 30 minutes held at 50° C. The 700 cm-gm load cartridge was used. The chart readings, as Chart Units or C.U., were read and reported directly for the peak, 60-minute and 120-minute viscosities.

Aged Gel Strength: At the end of the final hold period, the paste from the Brabender cook was poured into Gaertner gel test jars. Discs fastened to hangers were positioned in the paste. The surface of the paste was then flooded with light mineral oil. The paste was stored for 24 hours at 25° C to permit formation of a gel. The strength of the aged gel was measured by determining the force required to break the embedded disc free from the gel. This force was determined with a Gelometer manufactured by Gaertner Scientific Corp., Chicago, Ill. The procedure for the gel strength measurement was described in an article by E. T. Hjermstad in *Cereal Chemistry*, Vol. 32, No. 3 (May 1955), entitled "A Recording Gel Tester."

Paste Clarity: An appropriate amount of dry basis starchsample was mixed with distilled water. The pH of the mixture was adjusted to 6.5. The mixture was heated to boiling and held at a gentle rolling boil for a suitable period. Water was added to restore the weight of the paste to the original mixture weight. The paste was cooled to 25° C. A Nessler tube was positioned over a white paper with its flat, closed end centered on a black spot placed on the paper. Paste was added to the tube until the spot could barely be discerned through the paste. The depth of the paste in centimeters in the tube was measured and reported as the paste clarity.

Degree of Substitution (D of S): Determined using the procedure of Harlan J. Lortz, *Analytical Chemistry*, Vol. 28, No. 5, 892 (May 1065), "Determination of Hydroxyalkyl Groups in Low-Substituted Starch Ethers." The values are reported as the number of hydroxyalkyl groups per anhydroglucose unit.

Carboxylic Acid Groups: 5.00 g of dry basis starch sample were mixed into 50 ml of 0.1 normal hydrochloric acid solution. The mixture was stirred periodically for 30 minutes at room temperature. The sample was recovered on a medium porosity sintered glass filter. The sample was washed with distilled water until the filtrate was found to be free of chloride ions. The sample was then washed from the filter and the mixture made up to 300 ml with distilled water. The mixture was heated to and held at a gentle rolling boil for 5 to 7 minutes. After the addition of 8 to 10 drops of phenolphthalein indicator solution, the paste was titrated hot with 0.1 normal sodium hydroxide solution to the first permanent (15 seconds) light pink color. The amount of carboxyl groups was calculated from the titer.

Film Preparation: Starch samples were cooked in distilled water at concentrations which gave pastes suitable for casting. The samples were cooked at or near a rolling boil for a minimum of 5 minutes. The resulting pastes were cooled with gentle stirring and placed under partial vacuum to eliminate most of the air bubbles. Suitable pastes were cast on freshly cleaned plate glass using a Boston-Bradley applicator doctor blade. The gap of the doctor blade was adjusted so that the dried film thickness would be near 1 mil. The films were dried under ambient conditions. Sections of the films were then stripped from the plates and sections which appeared free from flaws were selected for testing.

FILM ANALYSIS a. Tensile strength and film stretch

Sections of films were cut into strips measuring 4 inches by exactly ½ inch after being conditioned for at least 24 hours at 22° C and 50 percent relative humidity. Film thickness was measured at 3 places on each strip and the results averaged. Tensile strength and amount of stretch at the instant of rupture were measured with the Instron Universal Testing Instrument, manufactured by Instron Corporation, Canton, Mass. The instrument conditions were as follows: cross-head speed, ½ inch/minute; load cell, CM; and initial jaw separation, 2.000 inches. Eight to 10 strips were tested for each product. The average and standard deviation were calculated for thickness, tensile strength and stretch.

b. Film solubility

Sections of the film not suitable for tensile strength and film stretch evaluation were ground in a Wiley mill to pass a 40 mesh sieve (U.S. Standard) and tested for solubility in water. 2.00 g of dry basis film were weighed into a 100-ml centrifuge bottle and made up to 100 g of suspension with distilled water. The bottle was held in a 76.7° C water bath for 30 minutes while stirring the mixture sufficiently to keep the film particles suspended. The bottle was taken from the bath, the outside dried, and the original weight restored by the addition of water. The bottle was centrifuged for 15 minutes at 1800 rpm in an International Centrifuge, Size 2, Model V. 50.00 g of supernatant were weighed into a platinum crucible and evaporated to dryness under a heat lamp. The percent soluble starch was calculated from the amount of residue.

Ash: 5 g of dry basis starch sample were weighed into a tared platinum crucible and charred over a low flame. The charred starch-containing crucible was then placed in a muffle furnace and maintained at 533° C to constant weight. The weight of the residue in the crucible was determined and is reported as percent ash, basis dry weight of the sample.

In order to more clearly describe the nature of the present invention, specific examples will hereinafter be described. It should be understood, however, that this is done solely by way of example and is intended neither to delineate the scope of the invention nor limit the ambit of the appended claims. In the preceding description and in the following examples, all percentages are based upon the dry substance weight of starch present, unless otherwise indicated.

EXAMPLE I

This example illustrates the preparation of oxidized hydroxyethyl starch on a commercial scale.

An aqueous slurry of about 60,000 pounds of common corn starch in granular form (33.8 percent by weight starch) was pumped into a reaction tank in which it was constantly agitated. Sufficient caustic-salt solution was added to provide a concentration of 1.65 percent NaOH and 6.1 percent NaCl. The caustic-salt solution contained 0.55 pounds per gallon of NaOH and 2.13 pounds per gallon of NaCl.

The resultant alkaline slurry was warmed to 42° C and ethylene oxide was added to a concentration of 2.67 percent. After 9 hours, the hydroxyethyl starch slurry was neutralized with HCl to a pH of 7 to 7.5. The slurry was heated to 49° C and sufficient sodium hypochlorite was added to provide in the slurry 2 percent available chlorine. After about 5 hours, the slurry was acidified to 12 filtrate acidity (titer of 10 ml of filtrate using 0.10 N NaOH). The slurry was maintained under these conditions until the product had an alkaline past fluidity of 363, and then was neutralized to a pH of 5.5 to 6. The slurry was vacuum filtered, washed and dried to a moisture level of 10 to 13 percent.

EXAMPLE II

This example illustrates alternate methods of preparing oxidized hydroxyethyl starches and compares the properties of such starches with the properties of oxidized and hydroxyethyl starches.

Into a slurry containing 35.5 percent by weight common corn starch at a pH of 6.0 and a temperature of 43° C, was incorporated a sufficient amount of a solution of sodium hypochlorite to provide 3.50 percent available chlorine. After 18 hours of constant stirring at 43° C a portion of the slurry was filtered, washed and dried at an air temperature of 71° C in a Proctor and Schwartz drier (Product No. 1). The remaining portion of the slurry was made alkaline by adding a solution containing 6.6 g of sodium hydroxide and 25.6 g of sodium chloride per 100 ml of solution. To this slurry was added 2.67 percent ethylene oxide. At the end of 22 hours at 43° C, the pH of the slurry was adjusted to 6 to 6.5 with HCl, filtered, washed and dried at an air temperature of 71° C in a Proctor and Schwartz drier (Product No. 2).

Another portion of an identical corn starch slurry was made alkaline in the manner described above 2.67 percent ethylene oxide was added to the slurry and after 18 hours the pH was adjusted to 6 with HCl. A portion of the slurry was held for 24 hours and filtered, washed and dried at an air temperature of 71° C in a Proctor and Schwartz drier (Product No. 3). Into the remaining slurry was incorporated a sodium hypochlorite solution to provide 3.50 percent available chlorine. After 20 hours at 43° C the slurry was filtered, washed and dried at an air temperature of 71° C in a Proctor and Schwartz drier (Product No. 4).

Various properties of the aforeprepared starch products were determined and are set forth in Table I, below.

TABLE 1

| Product No. | 1 | 2 | 3 | 4 |
|---|---|---|---|---|
| Processing steps | Oxidation | Oxidation, then hydroxyethylation | Hydroxyethylation, then oxidation | Hydroxyethylation |
| D. of S. moles of hydroxyethyl per AGU | 0 | 0.029 | 0.036 | 0.043 |
| Amount of carboxyl group (percent) | 0.52 | 0.56 | 0.56 | 0.12 |
| Ash, % wt., dry basis | 1.19 | 1.44 | 1.45 | 0.62 |
| Alkaline Paste Fluidity | 376 | 378 | 375 | 304 |
| Brabender cooks | | | | |

TABLE 1-continued

| Product No. | 1 | 2 | 3 | 4 |
|---|---|---|---|---|
| Processing steps | Oxidation | Oxidation, then hydroxyethylation | Hydroxyethylation, then oxidation | Hydroxyethylation |
| Starch concentration, % wt., dry basis | 30 | 30 | 30 | 8 |
| Peak viscosity | 1480 | 1080 | 2470 | 855 |
| 60-minute viscosity, end 95° C hold | 120 | 60 | 65 | 370 |
| 90-minute viscosity, end cool | 440 | 190 | 320 | 790 |
| 120-minute viscosity, end 50° C hold | 770 | 245 | 375 | 650 |
| Aged Gel Strength, g-cm | 937 | 88 | 90 | 48 |
| Paste clarity, cm depth | 6.2* | 9.1* | 13.2* | 3.6** |
| Film Properties | | | | |
| Thickness, mils | 0.92 ± 0.08 | 0.70 ± 0.17 | not determined | 0.74 ± 0.15 |
| Tensile strength, kg/mm$^2$ | 2.65 ± 0.47 | 6.11 ± 1.09 | not determined | 5.81 ± 0.96 |
| Stretch, % original length | 1.30 ± 0.30 | 2.65 ± 0.55 | not determined | 3.75 ± 0.90 |
| Water solubility | 100 | 100 | 100 | 34.7 |

*8 percent sample suspension boiled 1 min.
**3 percent sample suspension

The data in Table 1 show that Products 2 and 3 had markedly lower aged gel strength than the Product 1, although all three had nearly the same fluidity.

Product 4 had to be cooked at a much lower starch concentration than the others because of its excessive viscosity. Therefore, the low gel strength for Product 4 was due to low solids as well as to low retrogradation.

The sequence of the steps of oxidation and hydroxyethylation is important. Hydroxyethylation of oxidized starch resulted in a lower hydroxyethyl D of S than when such reactions were performed in the reverse order.

Product No. 3 had better paste clarity than the other 3 products.

EXAMPLE III

This example compares the properties of an oxidized hydroxyethyl starch with certain prior art starch products.

Preparation of Hydroxyethyl Starch (Product No. 5)

Into a slurry containing 35.5 percent common corn starch at a temperature of 43° C was incorporated an amount of a caustic-salt solution sufficient to provide 0.63 g of NaOH and 2.33 g NaCl per 100 ml of slurry. To the slurry was added 2.67 percent ethylene oxide. After 16 hours with stirring at a temperature of 43° C, HCl was added to adjust the pH to 6. The slurry was heated to 49° C with stirring and a sufficient amount of a solution of sodium hypochlorite was added to provide 3.5 percent available chlorine. After 5½ hours a small amount of sodium bisulfite was added to reduce the residual hypochlorite, and the pH of the slurry was adjusted to 6 by the addition of HCl. The slurry was filtered, washed and dried at an air temperature of 71° C in a Proctor and Schwartz drier.

Preparation of Acid Modified Hydroxyethyl Starch (Product No. 6)

Into a slurry containing 35.5 percent common corn starch at a temperature of 43° C was incorporated an amount of caustic-salt solution sufficient to provide 0.63 g of NaOH and 2.33 g NaCl per 100 ml of slurry. To the slurry was added 2.67 percent ethylene oxide. After 16 hours with stirring at a temperature of 43° C, HCl was added to provide a filtrate acidity of 20.5. After 12 hours, the slurry was filtered, washed and dried at an air temperature of 71° C in a Proctor and Schwartz drier.

Preparation of Acid Modified Starch (Product No. 7)

Into a slurry containing 35.5 percent common corn starch at a temperature of 43° C was incorporated sufficient HCl to provide a filtrate acidity of 24.5. The slurry was maintained at a temperature of 43° C for 12 hours with constant stirring and then filtered, washed and dried at an air temperature of 71° C in a Proctor and Schwartz drier.

The above three starch products and Product No. 1 (Example 1) were tested for various characteristics and properties. The results of this testing are set forth in Table 2.

TABLE 2

| Product No. | (From Example I) 1 | 5 | 6 | 7 |
|---|---|---|---|---|
| Processing Steps | Oxidation | Hydroxyethylation, then oxidation | Hydroxyethylation, then acid modification | Acid Modification |
| D. of S. moles of hydroxyethyl per AGU | 0 | 0.031 | 0.044 | 0 |
| Amount of carboxyl group (percent) | 0.52 | 0.54 | 0.11 | 0.10 |
| Ash, % wt., dry basis | 1.19 | 1.37 | 0.95 | 0.33 |
| Alkaline Paste Fluidity | 376 | 373 | 377 | 373 |
| Brabender cooks | | | | |
| Starch concentration, % wt., dry basis | 30 | 30 | 30 | 30 |
| Peak viscosity | 1480 | 2700 | 1050 | 1610 |
| 60-minute viscosity, end 95° C hold | 120 | 95 | 75 | 780 |
| 90-minute viscosity, end cool | 440 | 500 | 560 | Too Thick |
| 120-minute viscosity, end 50° C hold | 770 | 560 | 1140 | Too Thick |
| Aged Gel Strength, g-cm | 937 | 196 | 900 | Too Thick |
| Paste clarity, cm depth | 6.2* | 8.5* | 3.0* | 1.5* |
| Film Properties | | | | |
| Thickness, mils | 0.92 ± 0.08 | 0.51 ± 0.07 | 0.48 ± 0.13 | 0.61 ± 0.21 |
| Tensile strength, Kg/mm$^2$ | 2.65 ± 0.47 | 7.26 ± 1.63 | 9.96 ± 1.24 | 7.48 ± 2.24 |
| Stretch, % original length | 1.30 ± 0.30 | 2.44 ± 0.45 | 3.50 ± 1.23 | 2.27 ± 0.57 |
| Water solubility | 100 | 100 | 91.8 | 59.3 |

*8 percent sample suspension boiled 1 min.

From Table 2 it is seen that the alkaline paste fluidities of all four products are substantially equal which indicates that that average molecular weights are also substantially equal. From this one skilled in the art would presume that the characteristics or properties of the starch products would be about the same, all other factors being equal. However, it is apparent from Table 2 that the aged gel strength of the oxidized hydroxyethylated product was significantly lower than the other products and the paste clarity of this product was also significantly better than the paste clarity of the other products.

The difference between the 90-minute viscosity and the 120-minute viscosity is an indication of paste stability; the smaller the difference the better the paste stability. The oxidized hydroxyethyl starch product had a better paste stability than the other three starch products.

slurry and the amount of salt shown in Table 3. The slurry was heated to 43° C and ethylene oxide added with constant stirring. After 16 hours sufficient HCl was added to adjust the pH of the slurry to 6. Into this slurry was incorporated a solution of sodium hypochlorite to provide the required amount of available chlorine. After 24 hours, the pH of the slurry was adjusted to 6, filtered, washed and dried at an air temperature of 71° C in a Proctor and Schwartz drier. The exact conditions of preparing each of the products are set forth in Table 3. The filtering and washing characteristics of each of the products were observed and the observations also entered in Table 3.

TABLE 3

| Product No. | Available Chlorine | Amount of Carboxyl Groups | Ethylene Oxide Added | Hydroxyethyl D. of S. | Slurry Condition | Filtration and wash | Condition of dried Product | Ash | NaCl Added G./100 ml Slurry | Maximum Allowable Amount of Carboxyl Groups |
|---|---|---|---|---|---|---|---|---|---|---|
| | (% wt.) | (% wt.) | (% wt.) | | | | | (% wt.) | | (% wt.) |
| 8 | 0 | 0.117 | 0 | 0 | Thin | Good | Good | 0.51 | 2.1 | |
| 9 | 0 | 0.113 | 1.81 | 0.040 | Thin | Good | Good | 0.36 | " | |
| 10 | 0 | 0.108 | 2.67 | 0.078 | Thin | Good | Good | 0.29 | " | |
| 11 | 0 | 0.122 | 4.30 | 0.098 | Thin | Good | Fair | 0.56 | 3.1 | |
| 12 | 0 | — | 6.45 | 0.166 | Creamy | Slow, soft cake | Poor, pasted lumps | 0.92 | 4.1 | |
| 13 | 1.75 | 0.234 | 2.67 | ~0.078* | Thin | Good | Good | 0.58 | 2.1 | 0.64 |
| 14 | 3.50 | 0.540 | 0 | 0 | Thin | Fair | Good | 1.63 | 0 | — |
| 15 | 3.50 | 0.500 | 1.81 | 0.038 | Thin | Fair | Good | 1.22 | 2.1 | 0.93 |
| 16 | 3.50 | 0.500 | 2.67 | ~0.078* | Thin | Good/Slow | Fair, some gritty particles | 1.01 | 2.1 | 0.64 |
| 17 | 3.50 | 0.572 | 4.30 | 0.093 | Creamy | Slow | Fair | 1.44 | 3.1 | 0.55 |
| 18 | 3.50 | — | 6.45 | ~0.166* | Thick, creamy | Not possible | | — | 4.1 | 0.04 |
| 19 | 5.25 | 0.713 | 2.67 | ~0.078* | Slightly thick | Slow | Fair, lots of gritty particles | 1.61 | 2.1 | 0.64 |
| 20 | 7.00 | 0.972 | 0 | 0 | Thin | Slow | Fair, gritty particles | 4.15 | 0 | — |
| 21 | 7.00 | — | 2.67 | 0.067 | Creamy | Very slow, poor | Highly pasted, unusable | 4.64 | 2.1 | 0.73 |
| 22 | 7.00 | — | 6.45 | ~0.166* | Very thick, syrupy | Not possible | Not determined | — | 4.1 | 0.04 |

*assumed value based upon analysis of other products prepared using the same quantity of ethylene oxide.

EXAMPLE IV

This example illustrates the limits of the present invention in respect to the maximum allowable amount of carboxylic acid groups. A series of products was prepared by the following general method:

Into a starch slurry containing 35.5 percent common corn starch was incorporated an amount of caustic-salt solution sufficient to provide 0.57 g NaOH per 100 ml of From the Table it is seen that when the filtration and washing characteristics of the products were poor, the amounts of carboxylic groups were greater than 1.2 minus the product of 7 times the hydroxyethyl groups. Poor filtration characteristics indicate the degree of starch granule damage. In commercial scale starch granular damage must be minimized if such products are to be recovered and washed by conventional means.

In Table 4, the rhelogical properties of the products are set forth. It is apparent from the Table that the oxidized hydroxyethyl products had a lower aged gel strength than the products which were simply hydroxyethylated.

TABLE 4

| Product No. | Amount of Carboxyl Groups | Hydroxyethyl D. of S. | Alkaline Paste Fluidity | Brabender Cooks | | | Aged Gel Strength |
|---|---|---|---|---|---|---|---|
| | | | | Starch Conc. | Peak Viscosity | 60-minute Viscosity | |
| | (% wt.) | | | (% wt. dry) | | | (g-cm) |
| 8 | 0.117 | 0 | 209 | 8 | 685 | 520 | 604 |
| 9 | 0.113 | 0.040 | 207 | 8 | 830 | 370 | 75 |
| 10 | 0.108 | 0.078 | 202 | 8 | 995 | 435 | 33 |
| 11 | 0.122 | 0.098 | 202 | 8 | 1010 | 435 | 41 |
| 12 | — | 0.166 | 205 | 8 | 1080 | 395 | 52 |
| 13 | 0.234 | — | 209 | 8 | 380 | 155 | 7 |
| 14 | 0.540 | 0 | 283 | 20 | 575 | 40 | 88 |
| 15 | 0.500 | 0.038 | 282 | 20 | 910 | 40 | 8 |
| 16 | 0.500 | — | 280 | 20 | 870 | 40 | 6 |
| 17 | 0.572 | 0.093 | 284 | 20 | 635 | 30 | 6 |
| 18 | — | — | | No Product | | | |
| 19 | 0.713 | — | 288 | 25 | 555 | 30 | 10 |

TABLE 4-continued

| Product No. | Amount of Carboxyl Groups | Hydroxyethyl D. of S. | Alkaline Paste Fluidity | Brabender Cooks | | | Aged Gel Strength |
|---|---|---|---|---|---|---|---|
| | | | | Starch Conc. | Peak Viscosity | 60-minute Viscosity | |
| 20 | 0.972 | 0 | 293 | 35 | 440 | 60 | 26 |
| 21 | — | 0.067 | 292 | 35 | 830 | 30 | 6 |
| 22 | — | — | | | No Product | | |

In Table 5 are set forth the solubility, clarity and film properties of the previously prepared products.

TABLE 5

| Product No | Water Solubility | Paste Clarity | | Film Properties | | |
|---|---|---|---|---|---|---|
| | | Depth | Starch Conc. | Thickness | Tensile Strength | Stretch |
| | (% wt.) | (cm.) | (% wt.dry) | (mils) | (Kg/mm$^2$) | (% original) |
| 8 | 16.0 | 3.7 | 1 | 1.13 ± 0.13 | 6.18 ± 0.66 | 4.0 ± 1.1 |
| 9 | 35.0 | 3.7 | 1 | 1.01 ± 0.07 | 6.25 ± 0.37 | 5.9 ± 1.7 |
| 10 | 54.2 | 4.3 | 1 | 1.08 ± 0.10 | 5.55 ± 0.20 | 4.4 ± 1.2 |
| 11 | 60.2 | 4.7 | 1 | 1.15 ± 0.06 | 5.46 ± 0.20 | 5.8 ± 1.7 |
| 12 | 60.8 | 5.0 | 1 | 1.00 ± 0.23 | 5.87 ± 0.74 | 5.1 ± 1.6 |
| 13 | — | 8.5 | 10 | — | — | — |
| 14 | 100 | 4.2 | 10 | 0.75 ± 0.18 | 5.30 ± 1.09 | 2.3 ± 0.5 |
| 15 | 100 | 8.3 | 10 | 0.69 ± 0.28 | 4.04 ± 1.14 | 2.1 ± 0.5 |
| 16 | 100 | 10.0 | 10 | 0.81 ± 0.27 | 4.41 ± 1.35 | 2.3 ± 0.7 |
| 17 | 100 | 17+ | 10 | 1.61 ± 0.38 | 5.16 ± 0.91 | 3.4 ± 0.6 |
| 18 | | | | No Product | | |
| 19 | — | 14.5 | 10 | — | — | — |
| 20 | — | 4.2 | 10 | — | — | — |
| 21 | 100 | — | — | 0.97 ± 0.39 | 4.29 ± 1.26 | 3.5 ± 0.4 |
| 22 | | | | No Product | | |

From the above Table it is seen that as the amount of carboxylic groups and/or the hydroxyethyl D of S is increased, the water solubility also increases.

EXAMPLE V

This example illustrates a method of preparing an oxidized hydroxyethyl starch whereby oxidation with hypochlorite is performed at a highly alkaline pH.

Into a starch slurry containing 35.5 percent common corn starch was added an amount of caustic-salt solution sufficient to obtain 0.60 g NaOH per 100 ml of slurry and 2.21 g NaCl per 100 ml of slurry. The slurry was heated to 43° C and 2.67 percent ethylene oxide was added with constant stirring. After 16 hours at a pH of 11.5, the slurry was divided into two portions. One portion of the slurry was adjusted to a pH of 6 by the addition of HCl. Both portions were cooled to 35.5° C and sufficient hypochlorite solution added to each slurry to provide 3.5 percent available chlorine. After 32 hours, the pH of the slurry, (slurry which was adjusted to pH 6), was 7.5 and the pH of the other slurry was 11.2. The pH of both slurries was then adjusted to 6.0 with HCl, filtered, washed and dried at an air temperature of 71° C in a Proctor and Schwartz drier.

Certain of the characteristics of properties of the two starch products were determined and are set forth in Table 6 below.

TABLE 6

| Product No. | 23 | 24 |
|---|---|---|
| Oxidation pH, initial | 6.0 | 11.5 |
| D of S, moles of hydroxyethyl per AGU | 0.059 | 0.051 |
| Carboxyl content, % wt., dry basis | 0.56 | 0.41 |
| Alkaline paste fluidity | 467 | 474 |
| Brabender cooks (pH 6.5) | | |
| Starch concentration, % wt. | 20 | 20 |
| Peak viscosity | 970 | 285 |
| 60-minute viscosity, end 95° C hold | 30 | 20 |
| 120-minute viscosity, end 50° C hold | 115 | 65 |
| Aged gel strength, g-cm | 7 | 7 |

The above Table shows that when oxidation is performed at high alkaline pH's, the D of S and carboxyl content are lower than when the oxidation is performed at lower pH's.

EXAMPLE VI

This example illustrates the preparation of oxidized hydroxypropyl starch.

Into a starch slurry containing 33.8 percent common corn starch was added an amount of caustic-salt solution sufficient to obtain 0.60 g NaOH and 2.21 g NaCl per 100 ml of slurry. The slurry was heated to 29.5° C and 1 percent additional NaCl was added. 8 percent propylene oxide was incorporated into the slurry and after 65 hours with constant stirring, the pH was adjusted to 6.5 by the addition of HCl. The temperature of the slurry was raised to 43° C and a sufficient amount of hypochlorite was added slowly to provide 4.92 percent available chlorine. At this point the product had an alkaline past fluidity of 363. After 16 hours, the pH of the slurry was adjusted to 5.5 using HCl and the product filtered, washed and dried at an air temperature of 71° C in a Proctor and Schwartz drier. It was observed that during drying the starch in the center of the filter cake lumps was starting to gelatinize. When this was observed, the drying air temperature was reduced to 60° C and drying completed.

The oxidized hydroxypropyl starch product had a D of S of 0.102 and an alkaline paste fluidity of 365. The product, when gelatinized in water, formed a paste having good clarity and little tendency to retrograde. Dried film of the product was clear, had good strength and was completely soluble in water.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method for preparing a gelatinizable acid modified oxidized hydroxyalkyl starch by the sequential steps consisting essentially of:

a. reacting granular starch with a 1,2-alkylene epoxide containing 2 to 4 carbon atoms, inclusively, under non-gelatinizing conditions at a pH of above about 10 to obtain a granular starch having a hydroxyalkyl D of S of from about 0.02 to less than about 0.18,
b. adjusting the pH of the hydroxyalkyl starch to a range of from about 6 to about 8,
c. oxidizing the hydroxyalkyl starch with an alkaline hypochlorite under conditions to introduce an amount of carboxylic groups onto said starch, the amount of carboxylic groups, percent by weight dry starch basis, being no greater than about 1.2 minus the product of 7 times the hydroxyalkyl D of S.
d. treating the hydroxyalkyl oxidized starch with an acid to increase the alkaline paste fluidity thereof, said treatment being carried out under conditions such that
  1. the starch having a D of S of from about 0.02 to about 0.1 has an alkaline paste fluidity of less than about 293,
  2. the starch having a D of S of from about 0.11 to about 0.13 has an alkaline paste fluidity of less than about 283, and
  3. the starch having a D of S of from about 0.14 to less than about 0.18 has an alkaline paste fluidity of less than about 210, and
e. recovering the resulting product.

2. A method for preparing a gelatinizable oxidized hydroxyalkyl starch as defined in claim 1, wherein the granular starch is reacted with a 1,2-alkylene epoxide in the presence of a starch gelatinization inhibitor.

3. A method for preparing a gelatinizable oxidized hydroxyalkyl starch as defined in claim 2, wherein the 1,2-alkylene epoxide is ethylene oxide.

4. A method for preparing a gelatinizable oxidized hydroxyalkyl starch as defined in claim 3, wherein the alkaline hypochlorite is sodium or potassium hypochlorite.

5. A method for preparing a gelatinizable oxidized hydroxyalkyl starch as defined in claim 4, wherein the granular starch is corn starch.

* * * * *

UNITED STATES PATENT AND TRADEMARK OFFICE
CERTIFICATE OF CORRECTION

PATENT NO. : 4,048,434
DATED : September 13, 1977
INVENTOR(S) : Edwin L. Speakman It is certified that error appears in the above-identified patent and that said Letters Patent are hereby corrected as shown below:

Column 1

Line 16; "suspension" should read --suspensions--.

Column 2

Line 44; a comma should appear after "NaCl"; "NgSO$_4$" should read --MgSO$_4$--.

Line 59; "Preforming" should read --Performing--.

Column 4

Line 27; a space should appear between "starch" and "sample".

Line 40; "1065" should read --1956--.

Line 54; "phenolpthalein" should read --phenolphthalein--.

Column 6

Line 18; "past" should read --paste--.

Line 45; a period should appear after "above".

UNITED STATES PATENT AND TRADEMARK OFFICE
CERTIFICATE OF CORRECTION

PATENT NO. : 4,048,434

DATED : September 13, 1977

INVENTOR(S) : Edwin L. Speakman

It is certified that error appears in the above-identified patent and that said Letters Patent are hereby corrected as shown below:

Column 10

Table 4; sub-heading "(% wt. dry)" should be centered over data headed "Starch Conc.".

Column 11

Line 53; "of", second occurrence, should read --or--.

Signed and Sealed this

Seventh Day of March 1978

[SEAL]

Attest:

RUTH C. MASON
Attesting Officer

LUTRELLE F. PARKER
Acting Commissioner of Patents and Trademarks